INVENTORS
L. F. Polk and
BY W. F. Aller
Edward T. Noe Jr
atty.

Oct. 21, 1952 — L. F. POLK ET AL — 2,614,368

MACHINE TOOL

Filed May 6, 1948 — 4 Sheets-Sheet 4

INVENTORS
L. F. Polk and
BY W. F. Aller
Edward T. Noé Jr.
atty

Patented Oct. 21, 1952

2,614,368

UNITED STATES PATENT OFFICE 2,614,368

MACHINE TOOL

Louis F. Polk and Willis Fay Aller, Dayton, Ohio, assignors to The Sheffield Corporation, Dayton, Ohio, a corporation of Ohio Application May 6, 1948, Serial No. 25,446

10 Claims. (Cl. 51—165)

This invention relates to profile grinding machines and to a method and means to facilitate precise grinding of a desired contour on the workpiece.

One object of the invention is the provision of a profile grinding machine having an optical projector for producing an enlarged surface projection of the workpiece of such character that the physical characteristics of the surface are clearly apparent on the projection screen and making a burn in the work instantly observable.

Another object is the provision of a profile grinding machine of the character mentioned in which a dark image of the grinding wheel is produced on a readily observable projection screen and in which the observable projections of the grinding wheel and the work are clearly distinguished from one another by the brilliant light color appearance of the work projection.

Another object resides in the method of opaque projection in which two converging beams of light are directed on the work to be viewed so that the beams are in a common plane transverse of the direction of parallel scratches given to the work surface so that a brilliant detail revealing projection of the work surface results, as viewed from a direction between the illuminating beams.

Another object is the method of imparting a desired profile to a part, in which a surface of the part is given a series of generally parallel scratches and an enlarged surface projection of the scratched surface and a projection of the grinding wheel, on an enlarged scale, is produced on a projection screen with the work projection of a brilliant character as compared with the darker image of the grinding wheel, so that the work can be ground precisely to a desired profile by relative adjustments of the grinding wheel and the work while viewing the enlarged projection and comparing it with a desired guide line on the projection screen.

Another object is the provision of a contour grinding machine having means conveniently accessible to the operator's location for precisely controlling the movements of the tool supporting slides.

Another object is the provision of a profiling machine having tool and work holders relatively adjustable and in which precise adjustment of one of the holders is obtained by a fluid-filled system of constant capacity, one part of which is formed by a conveniently controllable element and another part of which embodies interfitting parts one of which is fixed to the adjustable holder and the other of which is manually controlled by an adjusting device that may be moved, as desired, for coarse adjustment purposes.

Other objects and advantages of the invention will be apparent from the following description, the appended claims and the accompanying drawings, in which, Fig. 1 is a perspective view of a profile grinding machine embodying the present invention;

Figure 1:
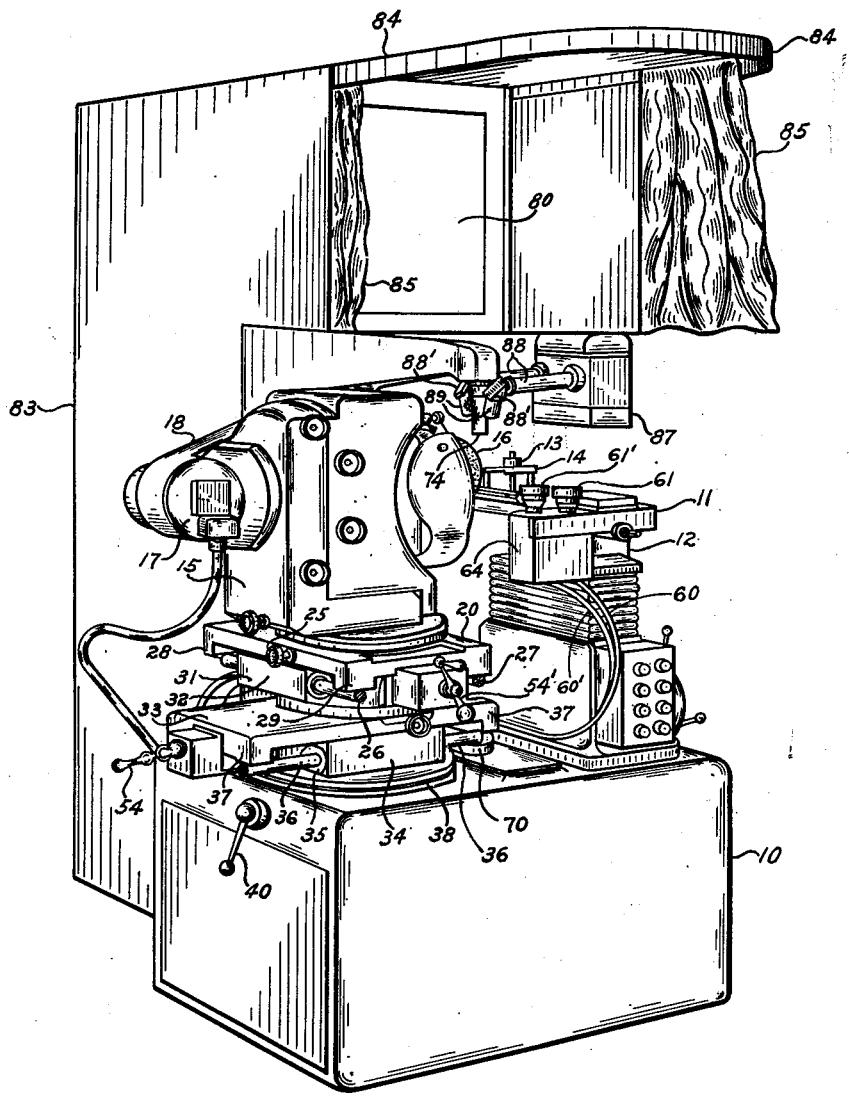

In the drawing, in which the same reference numerals are applied to like parts in the several views, the preferred form of the invention has been illustrated in its embodiment in an optical profile grinder having an optical projection device that provides an enlarged surface projection of the work. In this embodiment, the machine tool comprising a main frame 10 having a horizontal work supporting table 11 arranged for horizontal adjustment on a standard 12 that is vertically adjustable by any suitable means under the manual control of the operator so that the work can be located at the proper height and position for profiling. The workpiece itself may be clamped on the table by means of suitable holding screws 13 and a holder clamp 14 applied to the upper surface of the work.

Figure 2:
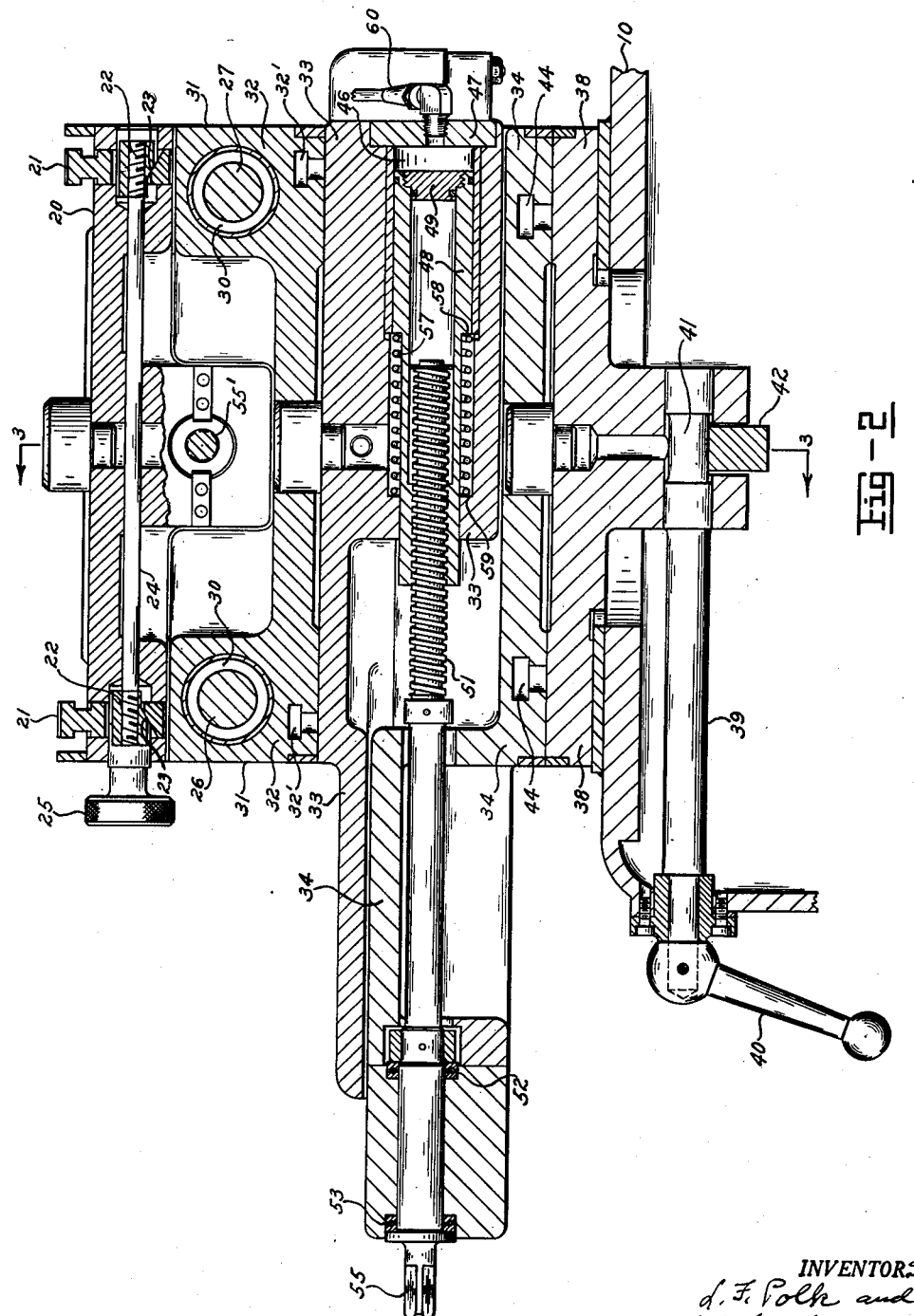
Fig. 2 is a vertical section through the middle of the tool holder taken in a plane extending towards the tool holder.
Figure 3:
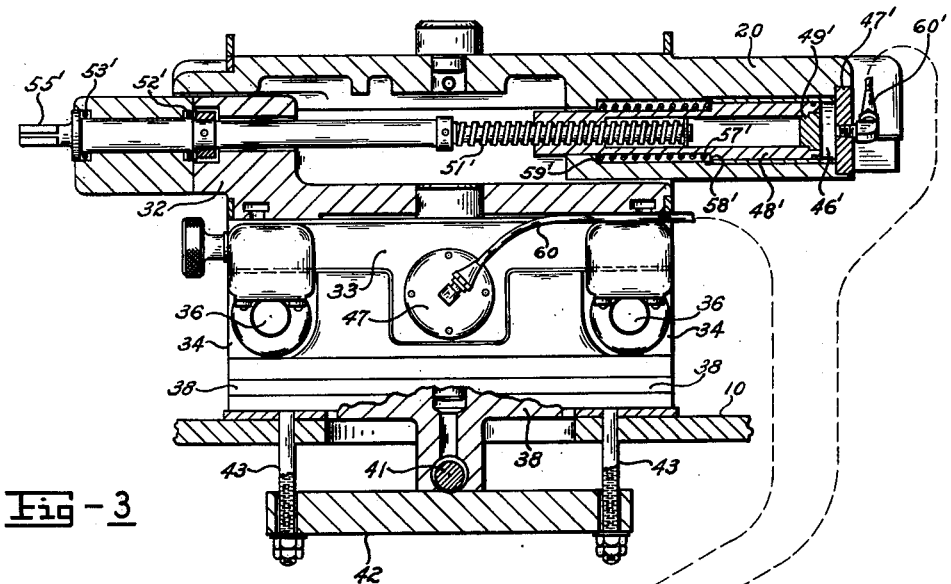
Fig. 3 is a vertical section on the line 3—3 of Fig. 2 with the central portion of the figure shown in elevation.
Figure 4:
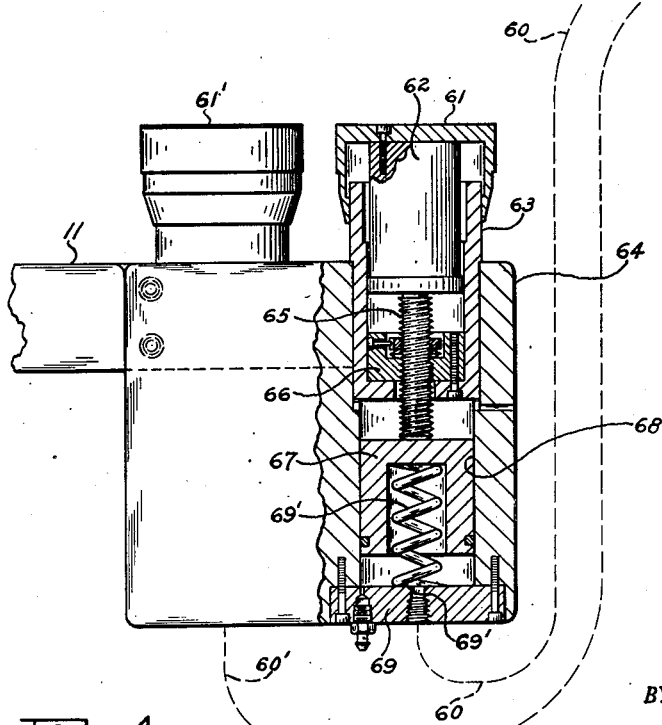
Fig. 4 is a front elevation of the two fine adjustment controls, one of which is shown in vertical section.

Arranged on the main frame 10 at one side of the work table is a tool holder generally designated 15 and carrying a grinding wheel 16 driven by an electric motor 17 through a belt 18 or other suitable driving mechanism which also causes vertical reciprocating movement of the grinding wheel on the holder 15. The tool holder 15 is arranged on slides and turn table as shown in Figs. 1, 2 and 3, so that the grinding wheel can be moved towards or away from the work holder and also along the edge of the work and also permitting the axis of rotation of the grinding wheel to be moved by adjusting the tool holder about a vertical axis in order that any desired movement may be given to the grinding wheel. Thus the wheel holder 15 is held for rotatable adjustment about a vertical axis on an upper slide 20 by means of suitable holding clamps 21 in engagement with an annular groove in the lower side of the wheel holder and operative to clamp the wheel holder down on the top of the slide 20 when the wedge blocks 22 are drawn towards one another in clamping engagement with cam surfaces 23 on the holders 21. The wedge blocks 22 are internally threaded, one right hand and one left hand, and engaged by a rotatable shaft 24 that can be operated by the hand knob 25. The slide 20 is carried by two guided bars 26 and 27 the ends of which are fixed to depending end flanges 28 and 29 on the slide. The middle portions of these bars are mounted for endwise movement in anti-friction bearing members 30 carried by upwardly projecting walls 31 of a drum 32 which is held for rotatable adjustment about a vertical axis on the top of a lower slide 33. Holding clamps similar to the clamp 21 operate in an annular groove 32' shown in Fig. 2. The tool holder can move on the slide 33 in a direction towards and from the operator, corresponding to the direction of the grinding wheel axis in the position of the parts illustrated.

The slide 33 is movable in a direction towards and from the work holder on the drum 34 having anti-friction bearing members 35 supporting front and rear bars 36 the ends of which are fixed to depending flanges 37 on the slide 33. The drum 34 is rotatable about its own axis on the base plate 38 which is held in fixed position on the main frame 10. A lock bar 39 operated by a lever 40 can be turned to clamp the drum 34 to plate 38 or to release the drum so it can be turned by hand on the plate to properly arrange the plane of rotation of the grinding wheel. The bar 39 has an eccentric portion 41 which presses down on a clamp bar 42 thus pulling downwardly on the bolts 43 the upper ends of which are adapted for engagement in the groove 44 in the drum 34.

The means for operating the upper slide 20 on the lower slide and for operating the lower slide on the base of the frame, to control the movements of the grinding wheel in a plurality of angularly related directions during grinding, comprises a fluid system of constant capacity for each of the slides, with individual control elements or pistons arranged adjacent one another in a position convenient to the operator standing in front of the machine. Coarse or rapid adjustments of the two slides are also provided so that the slides can be individually moved quite rapidly to bring them into approximate operation position. Thus as shown more particularly in Fig. 2, the slide 33 has a passage 46 closed at its outer end by cover plate 47 and forming a chamber that receives a piston 48 having an imperforate piston head 49. The piston 48 is hollow, as will be apparent, and the end of the piston opposite the head is guided in and suitably keyed against rotation within a cylinder bore in slide 33. This portion of the piston is internally threaded and engaged by an adjusting screw 51 rotatably carried by bearings 52 and 53 so as to cause endwise movement of the piston 48 when the screw is turned. The adjusting screw 51 can be rotated by a handle 54 applied to the outer end 55. Rotation of the screw 51 thus moves the piston 48 in an axial direction so that with liquid filling the cylinder space to the right of the piston and flow into or out of that space prevented, the piston 48 and the slide 33 will move as a unit. Movement of the piston towards the right as viewed in Fig. 2 under such conditions will carry the slide 33 with it since the liquid within the chamber 46 cannot be compressed, while movement of the piston towards the left will be followed by the slide 33 due to the action of a compression spring 57 interposed between a shoulder 58 on the piston and a shoulder 59 on the slide. It should be noted that the spring acts to yieldingly move the slide in a direction away from the workpiece so that should any leakage obtain in the fluid system tending to decrease the space between the end of the piston and the end cap 47 on the slide, then the grinding wheel instead of being moved towards the work and possibly causing damage would be moved away from the work.

The chamber 46 formed by the interfitting piston and cylinder elements just described, is connected by means of a pipe or conduit 60 extending to a control means located adjacent the operator's position at the front of the work table. This control comprises a control knob 61 mounted on a short shaft 62 that is rotatable within a bushing 63 secured in a mounting block 64. Fixed to the shaft 62 is an adjusting screw 65 threaded in a fixed nut 66 and engaging the upper side of a control piston 67. That piston is slidable in a cylinder 68 in the mounting block. The connecting pipe 60 extends to a passage in the end wall 69 placing the chamber below piston 67 in free communication with the chamber 46 and preventing loss of fluid from the system. A spring 69' yieldingly holds the control piston 67 up against the adjusting screw 65 but by turning the adjustment knob 61 the piston may be raised or lowered so as to cause fluid to flow in one direction or the other between the opposite ends of the closed fluid system. The diameter of the piston 67 may be much smaller than the diameter of the piston 48 so that a very precise control of the location of the slide 33 is afforded the operator as he adjusts the control knob 61 while carefully viewing the image of the work on the projection screen.

The slide 20 is similarly adjusted on slide 33 although the slide movements of these two slides are 90 degrees apart. The parts for adjusting slide 20 are given the same reference numerals with a prime mark, as in the case of the parts for slide 33. Thus the piston 48' is similarly arranged for coarse adjustment control by screw 51' movable by lever 54' and operable in bearings 52', 53'. The chamber 46' in slide 20 in which piston 48' operates is connected by conduit 60' to another control piston operated by control knob 61' adjacent knob 61. The two control members are preferably arranged on the work table 11 which normally does not move during the grinding operation so the operator will know exactly where he may place his hands on them and where they will be conveniently accessible without stretching or stooping.

Figure 5:
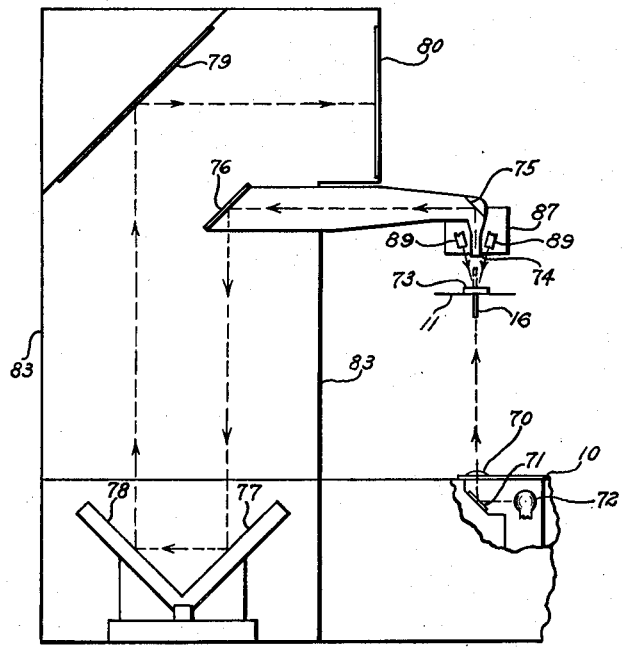
Fig. 5 is a side elevation of the machine on a reduced scale, showing the optical projection system.
Figure 6:
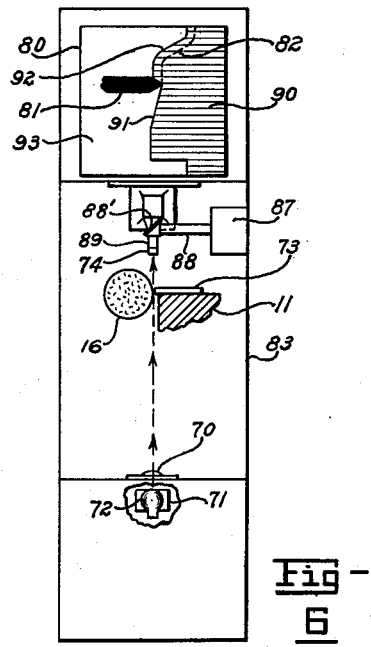
Fig. 6 is a front elevation corresponding to Fig. 5.

Arranged in the frame 10, as illustrated in Figs. 5 and 6, is a glass 70 below which is a reflector 71 to project a light beam coming from a lamp 72 vertically upwards along the edge of the workpiece 73 which is shown overhanging the side of the table 11. The light that is not interrupted by the grinding wheel or the work is received by the objective lens 74 focused on the work surface. The light is reflected by a mirror or prism 75 so as to travel horizontally back away from the operator's position where it meets a reflector 76. It is then reflected successively from mirrors 77, 78 and 79 before it meets the rear side of the viewing screen 80 where it gives an illuminated or light background and provides a dark shadow image 81 of the grinding wheel. The lens system is such that a suitable magnification is provided so that the projection may be for example twenty-five times the actual size of the work. The projection screen, which may be a ground glass or translucent plate, is provided with lines such as the line 82 that shows a desired contour to be given to the workpiece, line 82 being either a solid line or a dash line as may be desired. This line may be applied to a substantially transparent or translucent sheet of paper fastened to the glass plate itself instead of being made directly on the ground glass screen.

The several mirrors are carried in a housing 83 preferably of heavy sheet metal, fixed to the rear of the machine base 10 at the back of the base and extending upwardly to a point above the top of the tool and work holders. The screen 80 is above these holders at eye level, and faces directly towards the operator when he stands in normal working position, providing a close, convenient screen location. A projecting top wall 84 forms a support for a draw curtain 85 which may be drawn back of the operator's head to cut off a large part of the room illumination.

Figure 8:
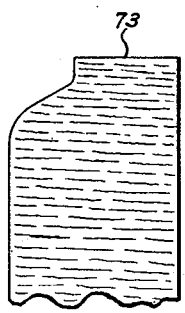
Fig. 8 is a view of the upper surface of the workpiece.

A desired illuminating system is provided for the upper surface of the workpiece so that a clear enlarged surface projection of the top of the workpiece is produced on the projection screen. This illuminating means comprises a suitable light source of high intensity arranged in a lamp housing 87 and providing two light beams through two parallel tubes 88, reflected by reflectors 88' and then traveling downwardly through the two inclined tubes 89 to provide two downwardly converging beams at opposite sides of the line of sight of the objective lens 74. These beams converge to a common area of illumination at the top of the work surface and converge in a plane which is transverse of the top of the work table and parallel to that edge of the work table which is overhung by the side portion of the workpiece to be profiled. The workpiece, before it is placed on the work table, is scratched in a direction towards the edge to be profiled, as shown in Fig. 8, so as to be given a series of generally parallel scratches as by rubbing it back and forth with emery cloth. While this may not produce any change in the apparent character of the work surface as viewed by the naked eye, it is an important step in fully utilizing the advantages of the method and apparatus of the present invention, since the light beams directed downwardly at an angle to the upper surface of the work and coming in a plane which is transverse of the direction of the scratches on the upper surface of the work, produces a bright or light gray detail revealing surface projection of the work, darker of course than the illuminated background but very much lighter than the shadow image of the grinding wheel. At the point of intersection of the grinding wheel with the work there is no doubt at all as to where the work begins and where the wheel begins. This brilliant illumination of the work surface makes burns on the work instantly perceptible due to a darkening of the work surface at the burned point so that if the operator should be moving the grinding wheel a little too fast and a burn starts to appear he can instantly reduce the speed of movement of the grinding wheel along the work or into the work.

Figure 7:
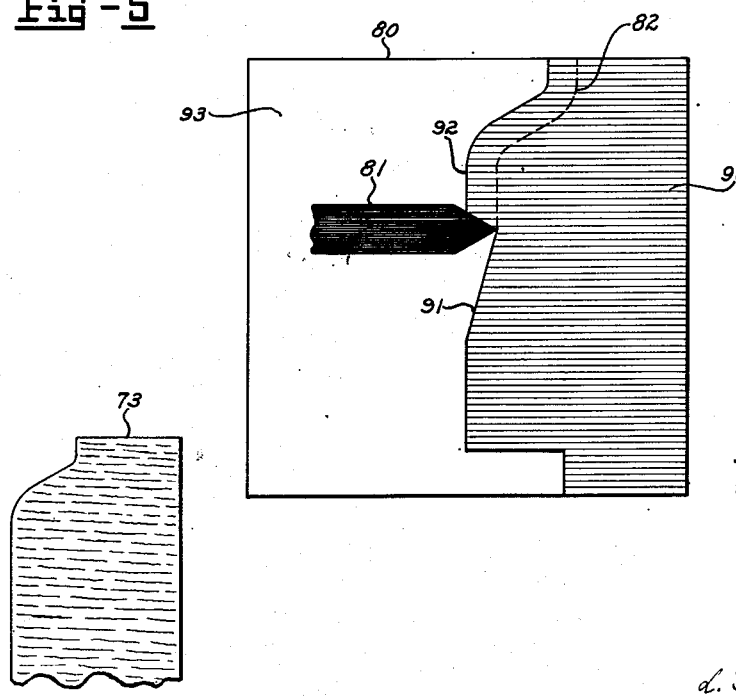
Fig. 7 is a detail view on an enlarged scale showing the character of the projection obtained on the viewing screen.

Fig. 7 shows the character of the enlarged projection on the viewing screen, in which the very dark gray or black projection 81 of the grinding wheel is quite clearly distinguished from the much brighter light gray surface projection 90 of the work surface. The projection of the work surface, as shown in this figure, shows a portion 91 ground or contoured to coincide with the guide lines 82 on the screen, while a portion 92 remains to be cut by the grinding wheel. The projections of the grinding wheel and of the work are both clearly outlined since the background 93 is substantially white due to its illumination by the uninterrupted beam coming from the lamp 72. The projection of the grinding wheel is very dark because the point on the grinding wheel viewed by the objective lens of the optical system is out of focus, yet it is clearly outlined as the grinding wheel, during its up and down reciprocation, comes into actual contact with the work. The field representing the surface of the work is a bright, light gray due to the reflection of the light beams coming from the inclined light tubes 89. Some of this light is reflected directly upwardly normal to the work surface as it strikes scratched portions of the work surface, since the scratches run normally to the vertical plane in which the light beams travel. Thus the operator may, while standing in front of the machine, control the fine adjustments of the tool in a plurality of different directions, and in doing so he may have a clear direct view of the projection screen in front of him. If he should move the tool a little to fast so a slight burn occurs, that is instantly observable on the projection screen. Such would not be the case in the conventional construction.

It is to be understood that the invention is not limited to the precise form of apparatus and the method herein described in connection with the invention in its preferred form, and that changes may be made therein without departing from the scope of the invention as defined in the appended claims.

We claim:

1. The method of opaque projection which comprises providing a flat surface that is to be viewed with a series of closely adjacent generally parallel stratches running in one direction, directing two converging beams of light on the surface with the beams arranged in a substantially common plane substantially transverse of the direction of the scratches and substantially transverse of said surface so that both beams strike the surface at an angle substantially less than a right angle to provide an illuminated zone, and making an amplified opaque projection of the surface at the illuminated zone as viewed from a direction perpendicular to the surface between the beams.

2. The method, in forming a predetermined shape on a side of a part having a flat surface generally transverse of that side, which comprises scratching the flat surface in a direction towards the said side to be shaped to provide a scratched area of substantial size with closely adjacent scratches throughout said area, arranging the part in a grinding machine, directing two converging beams of light on the surface with the beams arranged in a substantially common plane substantially transverse of the direction of the scratches and substantially transverse of said surface so that both beams strike the surface at an angle less than a right angle to provide an illuminated zone on said scratched area, making an amplified opaque projection on a viewing screen of the surface at the illuminated zone and at a zone of grinding contact as viewed from a direction perpendicular to the surface between the beams, grinding the side of the part to provide the predetermined shape by relatively adjusting a grinding wheel and the part while comparing the enlarged projection on the screen with a guide line on the screen having the enlarged desired shape.

3. The method in forming a predetermined shape on the side of a part having a flat surface generally transverse of that side, which comprises scratching the flat surface in a direction towards the said side to be shaped to provide an area of substantial size with closely adjacent substantially parallel scratches throughout, arranging the part in a grinding machine, directing two converging beams of light on the surface with the beams arranged in a substantially common plane substantially transvers of said surface so that both beams strike the surface at the grinding zone and in said area at an angle less than a right angle, directing another beam of light towards the grinding zone substantially perpendicular to the flat surface and in a direction substantially opposed to the direction of the converging beams so that the shadow of a grinding wheel is thrown on a viewing screen, making an amplified surface projection on the viewing screen of the said surface at the zone of grinding contact as viewed from a direction perpendicular to the surface between the converging beams, grinding the side of the part to provide the predetermined shape by relatively adjusting the grinding wheel and the part while comparing the enlarged projection on the screen with a guide line on the screen having the enlarged desired shape.

4. A grinding machine comprising a frame having a work table and a tool holder, adjustable means operably interconnecting said tool holder and frame for adjusting said tool holder towards the work holder, means for adjusting said tool holder along the work, a grinding wheel on said tool holder, said work table having a substantially horizontal top and side thereof facing towards the grinding wheel, a vertical stationary viewing screen, a housing fixed to the frame at the rear of said holders and extending upwardly to a point above the level of said holders and supporting said screen directly above the tool holder and work holder and facing outwardly towards the operator's position when the operator is facing the work holder and tool holder, said housing having light reflecting means and an objective lens for producing an enlarged surface projection of the face of the work on said screen, means for illuminating the upper surface of the work comprising a pair of light sources arranged on said frame to direct beams to said work surface which converge downwardly at substantially equal angles to a perpendicular from the work supporting surface of the work table in a plane which is transverse of the work table and substantially parallel to the side of the work table facing towards the grinding wheel and means providing an illuminated background on the projection.

5. In a machine tool, a frame having a work holder and a tool holder, a slide on which one of said holders is mounted, a support on said frame carrying said slide for rectilinear feed movement respecting the other holder, an operating part telescopically associated with said slide and providing therewith a fluid chamber of adjustable capacity, a threaded interconnection between said operating part and said frame and including a feed screw providing a coarse adjustment for positively moving said part in the direction of slide movement, means yieldingly urging said slide towards said part, control means including a control chamber having a manually adjustable control plunger, a fluid connection between said control means and said fluid chamber, a quantity of liquid filling said control chamber, fluid connection and fluid chamber, said fluid chamber, connection and control means providing a liquid filled fluid system of constant capacity so that feed movements of the slide are obtained by adjustment of said plunger.

6. In a grinding machine, a frame having a work holder and a grinding wheel holder, a slide carrying one of said holders for rectilinear feed movement, interfitting piston and cylinder elements one fixed to said slide, a manually adjustable feed screw operably interconnecting said frame and the other of said elements, said elements providing a fluid chamber of variable capacity, means yieldingly urging said piston and cylinder elements towards collapsed condition, an adjustable control chamber having means accessible to the operator for precise control of the size of said control chamber, and a fluid connection between said control chamber and fluid chamber, a quantity of liquid filling said control chamber, fluid connection and fluid chamber, said fluid connection, control chamber and fluid chamber providing therewith a liquid filled system of constant capacity.

7. In a machine tool, a frame having a work holder and a grinding wheel holder, a slide on which the grinding wheel holder is mounted, a support on said frame carrying said slide for rectilinear feed movement towards and from the work holder, an operating part telescopically associated with said slide and providing therewith a fluid chamber of adjustable capacity, a feed screw operably interconnecting said part and said frame and providing a coarse adjustment for positively moving said part in direction of slide movement, spring means yieldingly urging said slide towards said part and arranged so that the spring pressure on the slide tends to move the slide away from the work holder, control means including a control chamber having a manually adjustable plunger conveniently controllable from the operator's position, a fluid connection between said control means and said fluid chamber, a quantity of liquid filling said fluid chamber, control chamber and fluid connection, said fluid chamber and control means providing a liquid filled system of constant capacity so that feed movements of the slide are obtained by adjustment of said plunger.

8. In a machine tool, a frame having a work holder and a tool holder, a first slide on which said tool holder is mounted, a second slide operably mounted on said frame for rectilinear feed movement in one direction and carrying said feed slide for rectilinear feed movement in a second direction, an operating part telescopically associated with each of said slides and providing therewith fluid chambers of adjustable capacity, a feed screw operably interconnecting each of said operating parts to said frame for positively moving each of said operating parts in the direction of their slide movements, spring means yieldingly urging each of said slides towards its respective operating part relative to said frame, control means including a control chamber for each of said slides each having a manually adjustable control plunger located adjacent the operator's position, a fluid connection between each of said control means and its respective fluid chamber, a quantity of liquid filling said fluid chamber, fluid connection and control chamber, said fluid chamber, connection and control means of each slide providing a liquid filled fluid system of constant capacity so that feed movements of the slides are obtained by adjustment of said plungers.

9. In a grinding machine, a frame having a work holder and a grinding wheel holder, a pair of slides carrying one of said holders for rectilinear feed movements in different angularly related directions, and control means providing coarse and fine adjustments for each of said slides, each such control means comprising a feed screw, interfitting piston and cylinder elements one fixed to a slide and the other manually adjustable by said screw and providing a fluid chamber of variable capacity, means yieldingly urging said piston and cylinder element towards collapsed condition, an adjustable control chamber having a manually operable member for precise control of the size of said control chamber, and a fluid connection between said control chamber and fluid chamber, a quantity of liquid filling said fluid connection, control chamber and fluid chamber, said fluid connection, control chamber and fluid chamber providing therewith a liquid filled system of constant capacity, said frame supporting said control chambers closely adjacent one another in a position for convenient operation of their respective manually operable members by the operator.

10. In a machine tool, in combination, a frame having a work holder and a tool holder, a slide on which one of said holders is mounted, a support on said frame carrying said slide for rectilinear feed movement respecting the other holder, an operating part telescopically associated with said slide and providing therewith a fluid chamber of adjustable capacity, a threaded interconnection between said operating part and said frame and including a feed screw providing a coarse adjustment for positively moving said part in the direction of slide movement, means yieldingly urging said slide towards said part, control means including telescopic piston and cylinder elements forming a control chamber, a fluid connection between said control chamber and said fluid chamber, a quantity of liquid filling said control chamber, fluid connection and fluid chamber, said control chamber, fluid connection and fluid chamber providing a liquid filled fluid system of constant capacity so that feed movements of the slide take place as the capacity of the control chamber is changed and a manually operable adjusting screw operably engaging one of said elements to change its position relatively to the other of said elements to change the capacity of the control chamber.

LOUIS F. POLK.
WILLIS FAY ALLER.

REFERENCES CITED

The following references are of record in the file of this patent:

UNITED STATES PATENTS

| Number | Name | Date |
|---|---|---|
| 1,788,475 | Van Norman | Jan. 13, 1931 |
| 1,813,165 | Jung | July 7, 1931 |
| 1,881,984 | Van Norman | Oct. 11, 1932 |
| 2,067,491 | Kingsbury | Jan. 12, 1937 |
| 2,164,169 | Wohlfarth | June 27, 1939 |
| 2,248,446 | Wohlfarth | July 8, 1941 |
| 2,302,572 | Reason | Nov. 17, 1942 |
| 2,384,527 | Blesi | Sept. 11, 1945 |
| 2,399,907 | Blair | May 7, 1946 |
| 2,404,770 | Bennett | July 30, 1946 |
| 2,406,299 | Koulicovitch | Aug. 20, 1946 |
| 2,481,381 | Banko | Sept. 6, 1949 |

FOREIGN PATENTS

| Number | Country | Date |
|---|---|---|
| 178,288 | Switzerland | Sept. 16, 1935 |